United States Patent [19]

Imperto et al.

[11] 4,375,454
[45] Mar. 1, 1983

[54] ELECTROSTATIC ENRICHMENT OF TRONA AND NAHCOLITE ORES

[75] Inventors: Eugene G. Imperto, Willingboro, N.J.; Orval H. Hilliard, Spokane, Wash.

[73] Assignee: Intermountain Research and Development Corporation, Green River, Wyo.

[21] Appl. No.: 215,886

[22] Filed: Dec. 12, 1980

[51] Int. Cl.³ .................. C22B 26/10; B03C 7/00; B03C 1/00; C01D 31/24
[52] U.S. Cl. .......................... 423/206 T; 23/302 T; 209/127 R; 209/127 A; 209/128; 209/214
[58] Field of Search .................. 423/421, 206 T; 23/302 T; 207/127 A, 127 R, 127 C, 128, 129, 130, 131

[56] References Cited

U.S. PATENT DOCUMENTS

| | | | |
|---|---|---|---|
| 1,872,591 | 8/1932 | Hoeman | 209/108 |
| 2,765,074 | 10/1956 | Diamond | 209/127 A |
| 2,832,469 | 4/1958 | Lawver | 209/127 |
| 2,839,190 | 6/1958 | Lawver | 209/127 |
| 3,244,476 | 4/1966 | Smith | 23/63 |
| 3,458,039 | 7/1969 | Singewald | 209/9 |
| 3,477,566 | 11/1969 | Autenrieth et al | 209/9 |
| 3,479,133 | 11/1969 | Warzel | 23/63 |
| 3,480,139 | 11/1969 | Fricke et al. | 209/9 |
| 3,493,109 | 2/1970 | Carta et al. | 209/11 |
| 3,760,941 | 9/1973 | Singewald et al. | 209/3 |
| 3,819,805 | 6/1974 | Graves et al. | 423/206 T |
| 3,821,353 | 6/1974 | Weichman | 423/119 |
| 3,941,685 | 3/1976 | Singewald et al. | 209/9 |
| 3,962,403 | 6/1976 | Wyslouzil | 423/206 R |
| 4,341,744 | 7/1982 | Brison et al. | 423/206 T |

OTHER PUBLICATIONS

Perry, R. H. et al. Chemical Engineers Handbook, 5th Edition McGraw-Hill Book Co., NY. NY., 1973 pp. 21-62-21-65.
Faas, F. Electrostatic Separation of Granular Materials Bureau of Mines Bulletin #603, 1962, 155 pages.
Faas, Foster, Effect of Temperature on the Electrostatic Separation of Mineral Bureau of Mines Report of Investigation, Apr. 1966, 5213.
The Chemical Age, Metalurgical Section, Applied Electrostatic Separation Efficient Ore Dressing Technique, pp. 235-239, Sep. 1943.
H. B. Johnson, Selective Electrostatic Separation, Mining Technology Jan. 1938. A IMME TP 877.

Primary Examiner—Gary P. Straub
Attorney, Agent, or Firm—Robert W. Kell; Christopher Egolf

[57] ABSTRACT

Calcined trona and/or nahcolite bearing ore particles are separated into a plurality of fractions of relatively uniform particle size. Those calcined particles smaller than about 6.7 mm in size and larger than about 0.2 mm in size are passed through an electrostatic separator to obtain an ore concentrate containing a greater percentage of soda ash and a lesser percentage of insoluble impurities than were present in the ore; a middling fraction and an ore tailing fraction containing a lesser percentage of soda ash and a greater percentage of insoluble impurities than were present in the ore. The middling fraction may be recycled to increase the yield of ore concentrate. Calcined particles smaller than about 0.2 mm may be combined with the ore concentrate. The combined ore concentrate fraction may be marked as technical grade soda ash or used as a high grade feed to a monohydrate refining process.

10 Claims, 3 Drawing Figures

ELECTROSTATIC ENRICHMENT OF TRONA AND NAHCOLITE ORES

This invention relates to the beneficiation of trona and nahcolite ores.

Soda ash may be produced from natural crude trona or nahcolite ore by crushing, calcining the ore at an elevated temperature to form sodium carbonate and to remove organic materials, dissolving the calcined ore in water and filtering to remove insolubles. The oil shale and other gangue minerals admixed with trona and/or nahcolite bearing ores have always been a problem as such insolubles decrease efficiency and increase the cost of operation.

One approach to the separation of oil shale from a pure grade of trona ore by selectively pulverizing the ore and screening is described in U.S. Pat. No. 3,244,476 issued to Intermountain Research and Development Corporation. This method is effective in reducing the insolubles present in material that has been repeatedly passed through rollers and pulverized to a particle size less than 0.84 mm.

This process would appear to be ineffective in the beneficiation of nahcolite bearing oil shales containing large amounts of insolubles and does not enrich calcined ore particles larger than 0.84 mm.

It is an object of the present invention to beneficiate trona and/or nahcolite ores by reducing the insoluble impurities associated therewith.

Another object of this invention is to upgrade trona and/or nahcolite ores and produce a purified feed useful in the monohydrate process for the manufacture of soda ash.

Yet another object of this invention is to produce a technical grade of soda ash by a process that is less expensive than the conventional wet process.

In accordance with the present invention, trona and/or nahcolite ore, containing sodium carbonate in combination with insoluble impurities is beneficiated by separating calcined ore particles into a plurality of fractions containing particles of relatively uniform particle size, and passing each sized fraction through a high voltage gradient thereby effecting a second separation into an ore concentrate containing a greater percentage of sodium carbonate and a lesser percentage of insoluble impurities than were present in the sized fraction, and ore tailings containing a lesser percentage of sodium carbonate and a greater percentage of insoluble impurities than were present in that sized fraction.

The ore may be crushed prior to or after calcining. The calcined ore particles are then separated into a plurality of fractions of different particle size. Those fractions having a particle size of from about 6.35 mm to about 0.2 mm are passed through a high voltage gradient, i.e., an electrostatic separator or a high tension separator which further divides the calcined particles fed to the separator into an ore concentrate fraction, a middling fraction and an ore tailings fraction. If desired, the middling fraction may be recycled through the separator to increase the yield of ore concentrate. The calcined ore particles having a size of less than about 0.2 mm may be added directly to the ore concentrate fraction.

The ore concentrate fraction that results from this process contains a greater percentage of sodium carbonate and a lesser percentage of insoluble impurities than were present in the original ore. Moreover, the ore tailings fraction from the electrostatic separator contains a lesser percentage of sodium carbonate and a greater percentage of insoluble impurities than were present in the original ore.

In carrying out the process of this invention, the trona (or nahcolite) may first be crushed to a size range which can be processed by high tension or electostatic separators, i.e., to about −6.7 mm and then calcined. Alternatively, the ore may first be calcined and then crushed as this will result in increasing the formation of smaller particles. It is necessary, however, that the ore be calcined to provide at least a surface layer of sodium carbonate on the trona (or nahcolite) particles to render them readily separable from the (calcined) gangue minerals by passing the particles through a high voltage gradient.

The crushed, calcined trona (or nahcolite) ore should preferably be separated into sized fractions so that the largest and smallest particles within a fraction are similar in mass and surface area. This is a requisite for good operating practice with high tension (or electrostatic) separation. A workable scheme would be one separating calcined ore into the following fractions: 6.7×1.7 mm, 1.7×0.5 mm, 0.5×0.212 mm and −0.212 mm.

It has been observed that the −0.212 mm calcined material, separated by sizing, is a concentrate product of higher soluble alkali (sodium carbonate) content than are the larger sized fractions. This fraction requires no further processing to be utilized as an upgraded feed for a monohydrate process (or other wet process) for production of refined soda ash.

The sized fractions of calcined trona (or nahcolite) ore particles may be separated electrostatically into pinned products [contains most of the gangue (shale)]; pulled or thrown products (assays very high in soluble alkali values); and middling products. The middling product may be passed through additional stages of separation (or recirculated) until it eventually leaves in either the pinned or pulled (thrown) product streams as a tailing fraction or concentrate fraction, respectively.

In the process to be described, trona and nahcolite are substantially liberated from the associated gangue minerals (such as oil shale), which cannot be separated by selective mining, by (1) size reduction to −6.7 mm, (2) calcination, (3) sizing and (4) high tension or electrostatic separation.

It is known by those skilled in the art, that after calcination, trona and nahcolite are much more readily reduced in particle size by comminution, than are the associated gangue minerals (such as oil shale). This is because the trona and nahcolite lose relatively more strength during calcination than the gangue. Attrition inherent in the calcination processes accentuates the "movement" of soluble alkali values into the fines fraction, separable by sizing.

Applicants have observed that the relative conductivity and other electrical properties of the mineral particles are altered by calcination to accentuate the difference between trona (or nahcolite) and the associated gangue (such as oil shale) so that these particles become readily separable in a high potential electrostatic field or by high tension separation.

In order to better understand the present invention and the advantages occurring from its use some alternative embodiments thereof will now be described by way of examples which are not to be considered as limiting the invention in any way.

Alternative embodiments of this invention will be better understood by reference to the attached drawings wherein.

Figure 1:
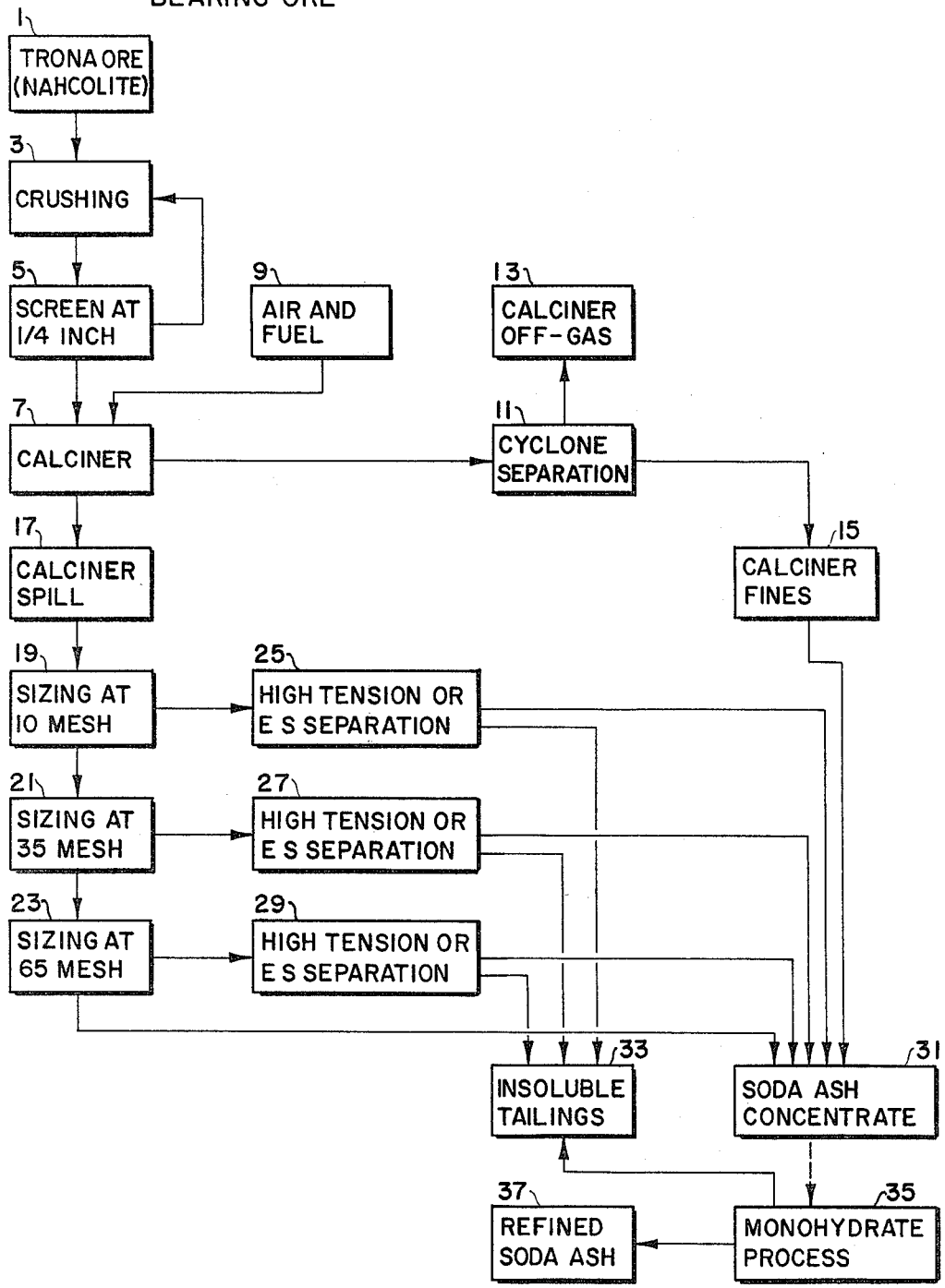
FIG. 1 shows a generalized flow sheet of the process to be described.

Referring now to FIG. 1, the trona and/or nahcolite ore 1 may be crushed 3, and screened 5. The larger particles that do not pass through the screen (+6.35 mm) are returned to the crusher 3. Those smaller particles that pass through the screen 5 are calcined 7 at a temperature of about 400° C. for 10 to 15 minutes to provide a surface coating of sodium carbonate on the trona (or nahcolite). Fuel and air, 9, are supplied to the calciner for combustion. The off gases from the calciner 7 escape through a cyclone separator 11 to a stack 13. Calciner fines 15 that are entrained in the off gases are removed in the separator 11 and collected with other soda ash concentrates in a container 31.

The calciner spill 17 is sized by passing through consecutively smaller screens. In the example illustrated, the first screen 19 has openings of 1.7 mm and calcined particles retained on this screen are passed through a high voltage gradient, i.e., high tension or electrostatic separator 25. The soda ash concentrate from separator 25 is collected in the container 31 and the insoluble ore tailings from the separator 25 is collected with other insoluble tailings in the container 33.

In the example illustrated by FIG. 1, calcined spill particles smaller than 1.7 mm and larger than 0.5 mm pass through the screen 19 and are collected on screen 21. The calcined particles retained on screen 21 are passed through a high voltage gradient, i.e., a high tension or electrostatic separator 27. The soda ash concentrate from the separator 27 is collected in the container 31 and the insoluble ore tailings from the separator 27 are collected in the container 33.

In the example illustrated by FIG. 1, calcined spill particles smaller than 0.5 mm and larger than 0.212 mm are collected on a screen 23. The calcined particles retained on the screen 23 are passed through a high voltage gradient, i.e., a high tension or electrostatic separator 29. The soda ash concentrate from the separator 29 is collected in the container 31 and the insoluble ore tailings from the separator 25 are collected with other insoluble tailings in the container 33.

In the example illustrated by FIG. 1, calcined spill particles smaller than 0.212 mm fall through the screen 23 and are added to the soda ash concentrate in container 31. The soda ash concentrate from container 31 may be used in the monohydrate process 35 to give a refined soda ash 37. Insoluble tailings from the monohydrate process 35 may be added to container 33.

In the following examples, Examples I-VI illustrate the use of electrostatic separation and Example VII illustrates the use of high tension separation.

EXAMPLE I

A sample of nahcolite bearing oil shale containing 44.41% solubles and 55.59 insolubles is first crushed and then sized by passing through Tyler Standard Screen Scale Sieves. The size analysis and distribution of values by sized fraction is summarized in Table I. It will be noted that the smaller particle fractions contain a higher percentage of nahcolite and a lower percentage of insolubles than the nahcolite bearing oil shale (heads) prior to sizing, showing that beneficiation of an uncalcined nahcolite oil bearing shale by sizing is significant.

TABLE I

Size Analysis and Distribution of Values by Sized Fraction

| Sized Fraction (mm) | % Weight | Nahcolite Assay (%)* | Nahcolite % Recovery | Insolubles Assay (%) | Insolubles % Recovery |
|---|---|---|---|---|---|
| +4.75 | 2.85 | 27.50 | 1.76 | 72.50 | 3.72 |
| 4.75 × 2.36 | 38.19 | 30.41 | 26.14 | 69.59 | 47.81 |
| 2.36 × 1.18 | 17.91 | 35.86 | 14.46 | 64.14 | 20.67 |
| 1.18 × 0.60 | 10.46 | 43.65 | 10.29 | 56.35 | 10.60 |
| 0.60 × 0.30 | 9.51 | 53.58 | 11.48 | 46.42 | 7.93 |
| 0.30 × 0.15 | 7.77 | 66.95 | 11.71 | 33.05 | 4.62 |
| 0.15 × 0.075 | 6.02 | 82.55 | 11.19 | 17.45 | 1.89 |
| −0.075 | 7.29 | 79.07 | 12.97 | 20.93 | 2.75 |
| Calculated Heads | 100 | 44.41 | 100 | 55.59 | 100 |

*By difference, 100-% Insol = % Nahcolite

Figure 2:
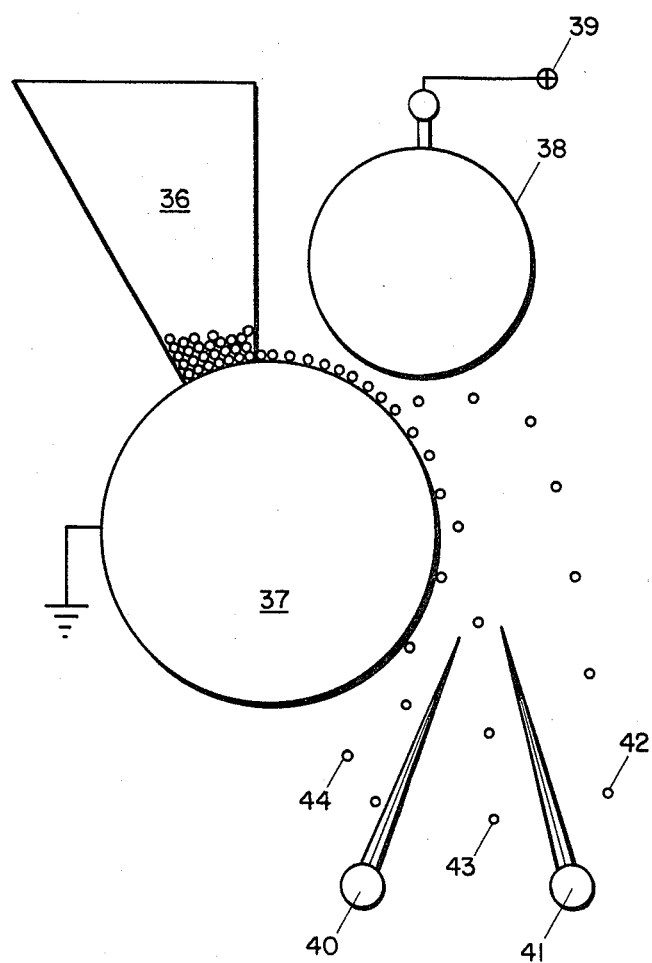
FIG. 2 illustrates a Bullock-Simpson Electrostatic Separator and shows the material flow.

Portions of uncalcined sized fractions identified in Table I above are treated on the Bullock-Simpson Electrostatic Separator manufactured by the National Engineering Company of Chicago, Illinois and illustrated in FIG. 2. As shown in FIG. 2, the Bullock-Simpson Electrostatic Separator is provided with a feed hopper 36, a clockwise rotating grounded feed roll which may be constructed of brass, a counterclockwise rotating dielectric roll 38 which may be constructed of rubber, a high voltage supply 39, means for adjusting the roll to roll horizontal angle $\alpha$ (not shown) and splitters 40 and 41 which may separate the feed into a pulled or thrown product (concentrate fraction 42), a middling fraction 43, and a pinned or non-conductor product (tailings fraction 44). A wide range of machine parameters were tried with no apparent separation of nahcolite. The uncalcined particles were not "active" in the electrostatic field, even at 20 KV.

EXAMPLE II

The sample of nahcolite bearing oil shale described above in Example I and Table I is surface calcined by drying overnight at 110° C. and is then processed on a Bullock-Simpson Electrostatic Separator at 21° C. under the following conditions:

| Sized Fraction (mm) | Feed Roll Type | Horiz. Angle | Air Gap (mm) | Rough (KV) | Clean (KV) | No. of Passes Free-fall Material |
|---|---|---|---|---|---|---|
| +2.36 | Micarta | −60° | 5.08 | 20 | 15 | 3 |
| 2.36 × 1.18 | Micarta | −60° | 3.175 | 14 | 12 | 3 |
| 1.18 × 0.60 | Micarta | −60° | 3.175 | 12 | 9 | 3 |
| 0.60 × 0.30 | Brass | −60° | 3.175 | 10 | 8.5 | 3 |
| 0.30 × 0.15 | Brass | −60° | .3175 | 8.5 | 8.5 | 3 |

The beneficiation by sizing, and electrostatic separator of the surface calcined ore sample of Example I is shown in Table II.

TABLE II

Metallurgical Balance, Beneficiation by Sizing and Electrostatic Separation, Surface Calcined Nahcolite of Example I, Weight Recovery

| Fraction or Product (mm) | % of Fraction | % of Product |
|---|---|---|
| +2.36 | 100 | 41.04 |
| Concentrate | 31.13 | 12.78 |
| Middling | 14.73 | 6.05 |
| Tailing | 54.14 | 22.22 |
| 2.36 × 1.18 | 100 | 17.91 |
| Concentrate | 41.56 | 7.44 |
| Middling | 17.40 | 3.12 |
| Tailing | 41.04 | 7.35 |
| 1.18 × 0.60 | 100 | 10.46 |
| Concentrate | 47.02 | 4.92 |
| Middling | 18.19 | 1.90 |
| Tailing | 34.79 | 3.64 |
| 0.60 × 0.30 | 100 | 9.51 |
| Concentrate | 54.34 | 5.17 |
| Middling | 18.56 | 1.77 |
| Tailing | 27.10 | 2.58 |
| 0.30 × 0.15 | 100 | 7.77 |
| Concentrate | 34.35 | 2.67 |
| Middling | 36.64 | 2.85 |
| Tailing | 29.01 | 2.25 |
| −0.15 | 100 | 13.31 |
| Calculated Heads | | 100 |

Metallurgical Balance, Beneficiation by Sizing and Electrostatic Separation, Surface Calcined Nahcolite of Example I, Nahcolite Recovery

| Fraction or Product (mm) | Assay* (%) | % of Fraction | % of Total |
|---|---|---|---|
| +2.36 | 30.19 | 100 | 27.90 |
| Concentrate | 64.41 | 66.06 | 18.53 |
| Middling | 29.24 | 14.27 | 3.98 |
| Tailing | 10.77 | 19.66 | 5.39 |
| 2.36 × 1.18 | 35.86 | 100 | 14.46 |
| Concentrate | 63.54 | 73.65 | 10.65 |
| Middling | 16.18 | 7.86 | 1.14 |
| Tailing | 16.16 | 18.49 | 2.67 |
| 1.18 × 0.60 | 43.65 | 100 | 10.29 |
| Concentrate | 69.07 | 74.41 | 7.66 |
| Middling | 41.65 | 17.37 | 1.79 |
| Tailing | 10.31 | 8.22 | 0.85 |
| 0.60 × 0.30 | 53.58 | 100 | 11.48 |
| Concentrate | 75.94 | 77.03 | 8.84 |
| Middling | 33.94 | 11.76 | 1.35 |
| Tailing | 22.17 | 11.22 | 1.29 |
| 0.30 × 0.15 | 66.95 | 100 | 11.71 |
| Concentrate | 82.80 | 42.84 | 5.02 |
| Middling | 67.51 | 36.95 | 4.33 |
| Tailing | 47.46 | 20.57 | 2.41 |
| −0.15 | 80.62 | 100 | 24.16 |
| Calculated Heads | 44.41 | | 100 |

*By difference: 100% Insol = % Nahcolite.

Metallurgical Balance, Beneficiation by Sizing and Electrostatic Separation, Surface Calcined Nahcolite of Example I, Insolubles Recovery

| Fraction or Product (mm) | Assay (%) | % of Fraction | % of Total |
|---|---|---|---|
| +2.36 | 69.81 | 100 | 51.53 |
| Concentrate | 35.59 | 15.87 | 8.18 |
| Middling | 70.76 | 14.93 | 7.79 |
| Tailing | 89.23 | 69.20 | 35.56 |
| 2.36 × 1.18 | 64.14 | 100 | 20.67 |
| Concentrate | 36.46 | 23.62 | 4.88 |
| Middling | 83.82 | 22.74 | 4.70 |
| Tailing | 83.84 | 53.64 | 11.09 |
| 1.18 × 0.60 | 56.35 | 100 | 10.60 |
| Concentrate | 30.93 | 25.80 | 2.73 |
| Middling | 58.35 | 18.83 | 2.00 |
| Tailing | 89.69 | 55.37 | 5.87 |
| 0.60 × 0.30 | 46.42 | 100 | 7.93 |
| Concentrate | 24.06 | 28.16 | 2.23 |
| Middling | 66.06 | 26.41 | 2.09 |
| Tailing | 77.83 | 45.43 | 3.60 |
| 0.30 × 0.15 | 33.05 | 100 | 4.62 |
| Concentrate | 17.20 | 17.87 | 0.83 |
| Middling | 32.49 | 36.01 | 1.66 |
| Tailing | 52.54 | 46.12 | 2.13 |
| −0.15 | 19.38 | 100 | 4.64 |
| Calculated Heads | 55.59 | | 100 |

It will be noted that fractions obtained by the combined steps of sizing, calcining and electrostatic separation assay as high as 82.80% solubles and as low as 17.87 insolubles.

By contrast, the nahcolite oil bearing shale of Example I contains 44.41% solubles and 55.59% insolubles.

A summary metallurgical balance of the beneficiation by sizing and electrostatic separation of this ore of Example I is given in Table III.

TABLE III

Summary Metallurgical Balance, Beneficiation of Surface Calcined Nahcolite by Sizing and Electrostatic Separation, Sample of Example I, Nahcolite

| Fraction or Product | % Weight Recovery | Assay* (%) | % Recovery |
|---|---|---|---|
| Conc. from ES Sepn** of +0.15 mm fractions | 32.98 | 68.07 | 50.60 |
| −0.15 mm fractions | 13.31 | 80.62 | 24.16 |
| Total Concentrate | 46.29 | 71.68 | 74.76 |
| Total Middlings | 15.69 | 35.63 | 12.59 |
| Total Tailings | 38.04 | 14.82 | 12.71 |
| Calculated Heads, Example I | 100 | 44.41 | 100 |

Summary Metallurgical Balance, Beneficiation of Surface Calcined Nahcolite by Sizing and Electrostatic Separation, Sample of Example I, Insoluble

| Fraction or Product | Assay (%) | % Recovery |
|---|---|---|
| Conc. from ES Sepn** of +0.15 mm fractions | 31.79 | 18.85 |
| −0.15 mm fractions | 19.38 | 4.64 |
| Total Concentrate | 28.15 | 23.49 |
| Total Middlings | 64.37 | 18.14 |
| Total Tailings | 85.32 | 58.35 |
| Calculated Heads, Example I | 55.59 | 100 |

*Calculated Assays: 100% Insol = % Nahcolite
**Electrostatic Separation

EXAMPLE III

A second sample of a nahcolite bearing oil shale from a different location than the ore sample described in Example I above is crushed and subjected to a size analysis by passing through Tyler Standard Screen Scale Sieve. The size and value distribution are reported in Table IV below.

TABLE IV

| Sized Fraction (mm) | Nahcolite % Weight | Assay (%)* | % Recovery |
|---|---|---|---|
| +4.75 | 7.66 | 2.39 | 1.08 |
| 4.75 × 2.36 | 39.64 | 7.61 | 18.07 |
| 2.36 × 1.18 | 18.50 | 14.16 | 15.68 |
| 1.18 × 0.60 | 12.52 | 28.67 | 21.48 |
| 0.60 × 0.30 | 8.97 | 26.18 | 13.52 |
| 0.30 × 0.15 | 5.42 | 31.88 | 10.35 |
| 0.15 × 0.075 | 3.55 | 47.30 | 10.05 |
| −0.075 | 3.74 | 43.53 | 9.75 |
| Calculated Heads | 100 | 16.71 | 100 |

| Sized Fraction (mm) | Insolubles Assay (%) | % Recovery |
|---|---|---|
| +4.75 | 97.61 | 8.98 |
| 4.75 × 2.36 | 92.39 | 43.97 |
| 2.36 × 1.18 | 85.84 | 19.07 |
| 1.18 × 0.60 | 71.33 | 10.72 |
| 0.60 × 0.30 | 74.82 | 8.06 |
| 0.30 × 0.15 | 68.12 | 4.43 |
| 0.15 × 0.075 | 52.70 | 2.25 |
| −0.075 | 56.47 | 2.53 |
| Calculated Heads | 83.29 | 100 |

*By difference, 100-% Insol = % Nahcolite

Portions of the uncalcined sized fractions of this second Sample (see Example III and Table IV above) were then tested on the Bullock-Simpson Electrostatic Separator using the following operating conditions:

| | |
|---|---|
| Feed size range: | +4.75 mm, 4.75 × 2.36 mm, 2.36 × 1.18 mm, 1.18 × 0.60 mm, 0.60 × 0.30 mm, 0.30 × 0.15 mm |
| Feed temperature: | 20° C. |
| Feed depth, feed roll: | one particle deep |
| Feed roll type and diameter: | Micarta, 76.2 mm dia.; Brass, 76.2 mm dia. |
| Feed roll to charged roll gap: | 3.175 mm to 6.35 mm |
| Feed roll surface speed and direction: | 127 cm–635 cm/min, clockwise |
| Charged roll type and diameter: | Rubber, 50.8 mm dia. |
| Charged roll surface speed and direction: | 127 cm–635 cm/min, clockwise and counterclockwise |
| Position: Charged roll to feed roll: | −60° to −20° horiz. angle |
| Potential: Charged roll to ground: | 0 to 20,000 volts |
| Splitter positions: | Set to "barely pass" free-fall mat'l. |

The particles as tested were not "active" in the electrostatic field even at 20 kilovolts.

EXAMPLE IV

The sample of nahcolite bearing oil shale described above in Example III and Table IV is surface calcined by drying overnight at 110° C. and is then processed on a Bullock-Simpson Electrostatic Separator at 21° C. under the following conditions:

| Sized Fraction | Feed Roll Type | Horiz. Angle | Air Gap | Clean (KV) | Rough (KV) | No. of Passes Free-fall Material |
|---|---|---|---|---|---|---|
| +2.36 mm | Brass | −55° | 5.08 mm | 16 | 20 | 3 |
| 2.36 × 1.18 mm | Brass | −55° | 5.08 mm | 13 | 16 | 3 |
| 1.18 × 0.60 mm | Brass | −55° | 5.08 mm | 14 | 15 | 3 |
| 0.60 × 0.30 mm | Brass | −55° | 5.08 mm | 14 | 16 | 3 |
| 0.30 × 0.15 mm | Brass | −55° | 5.08 mm | 14 | 14 | 3 |

The beneficiation by sizing and electrostatic separation of the surface calcined ore sample of Example III is shown in Table V.

TABLE V

Metallurgical Balance, Beneficiation by Sizing and Electrostatic Separation, Surface Calcined Nahcolite of Example III, Weight Recovery

| Fraction or Product (mm) | % of Fraction | % of Product |
|---|---|---|
| +2.36 | 100 | 47.30 |
| Concentrate | 6.28 | 2.97 |
| Middling | 22.37 | 10.58 |
| Tailing | 71.35 | 33.75 |
| 2.36 × 1.18 | 100 | 18.50 |
| Concentrate | 20.09 | 3.72 |
| Middling | 17.20 | 3.18 |
| Tailing | 62.71 | 11.60 |
| 1.18 × 0.60 | 100 | 12.52 |
| Concentrate | 26.88 | 3.37 |
| Middling | 48.44 | 6.06 |
| Tailing | 24.68 | 3.09 |
| 0.60 × 0.30 | 100 | 8.97 |
| Concentrate | 23.30 | 2.09 |
| Middling | 55.80 | 8.01 |
| Tailing | 20.90 | 1.87 |
| 0.30 × 0.15 | 100 | 5.42 |
| Concentrate | 34.06 | 1.85 |
| Middling | 30.69 | 1.66 |
| Tailing | 35.25 | 1.91 |
| −0.15 | 100 | 7.29 |
| Calculated Heads | | 100 |

Metallurgical Balance, Beneficiation by Sizing and Electrostatic Separation, Surface Calcined Nahcolite of Example III, Nahcolite Recovery

| Fraction or Product (mm) | Assay* (%) | % of Fraction | % of Total |
|---|---|---|---|
| +2.36 | 6.77 | 100 | 19.15 |
| Concentrate | 45.19 | 41.92 | 8.03 |
| Middling | 8.11 | 26.81 | 5.13 |
| Tailing | 2.97 | 31.27 | 5.99 |
| 2.36 × 1.18 | 14.16 | 100 | 15.68 |
| Concentrate | 57.96 | 82.20 | 12.89 |
| Middling | 5.39 | 6.57 | 1.03 |
| Tailing | 2.53 | 11.23 | 1.76 |
| 1.18 × 0.60 | 28.67 | 100 | 21.48 |
| Concentrate | 74.49 | 69.83 | 15.00 |
| Middling | 16.55 | 27.97 | 6.01 |
| Tailing | 2.57 | 2.20 | 0.47 |
| 0.60 × 0.30 | 25.18 | 100 | 13.52 |
| Concentrate | 52.82 | 48.91 | 6.61 |
| Middling | 21.20 | 47.00 | 6.35 |
| Tailing | 4.94 | 4.09 | 0.55 |
| 0.30 × 0.15 | 31.88 | 100 | 10.35 |
| Concentrate | 45.33 | 48.43 | 5.01 |

TABLE V-continued

| | | | |
|---|---|---|---|
| Middling | 39.10 | 37.64 | 3.90 |
| Tailing | 12.60 | 13.93 | 1.44 |
| −0.15 | 45.40 | 100 | 19.80 |
| Calculated Heads | 16.71 | | 100 |

Metallurgical Balance, Beneficiation by Sizing and Electrostatic Separation, Surface Calcined Nahcolite of Example III, Insolubles Recovery

| Fraction or Product (mm) | Assay* (%) | % of Fraction | % of Total |
|---|---|---|---|
| +2.36 | 93.23 | 100 | 52.95 |
| Concentrate | 49.58 | 3.34 | 1.77 |
| Middling | 91.73 | 22.01 | 11.65 |
| Tailing | 97.54 | 74.65 | 39.53 |
| 2.36 × 1.18 | 85.84 | 100 | 19.07 |
| Concentrate | 42.04 | 9.84 | 1.88 |
| Middling | 94.61 | 18.96 | 3.62 |
| Tailing | 97.47 | 71.20 | 13.58 |
| 1.18 × 0.60 | 71.33 | 100 | 10.72 |
| Concentrate | 25.51 | 9.62 | 1.03 |
| Middling | 83.45 | 56.67 | 6.08 |
| Tailing | 97.43 | 33.72 | 3.61 |
| 0.60 × 0.30 | 74.82 | 100 | 8.06 |
| Concentrate | 47.18 | 14.69 | 1.16 |
| Middling | 78.80 | 58.76 | 4.74 |
| Tailing | 95.06 | 26.55 | 2.14 |
| 0.30 × 0.15 | 68.12 | 100 | 4.43 |
| Concentrate | 54.57 | 27.34 | 1.21 |
| Middling | 60.90 | 27.44 | 1.22 |
| Tailing | 87.40 | 45.22 | 2.00 |
| −0.15 | 54.60 | 100 | 4.78 |
| Calculated Heads | 83.29 | | 100 |

*By difference: 100-% Insol = % Nahcolite

A summary metallurgical balance of the beneficiation by sizing and electrostatic separation of this ore of Example III is given in Table VI.

TABLE VI

Summary Metallurgical Balance, Beneficiation of Surface Calcined Nahcolite by Sizing and Electrostatic Separation, of Example III, Nahcolite

| Fraction or Product | % Weight Recovery | Assay* (%) | % Recovery |
|---|---|---|---|
| Conc. from ES Sepn** of +0.15 mm fractions | 14.00 | 56.79 | 47.54 |
| −0.15 mm fractions | 7.29 | 45.40 | 19.80 |
| Total Concentrate | 21.29 | 52.89 | 67.34 |
| Total Middlings | 26.49 | 14.13 | 22.42 |
| Total Tailings | 52.22 | 3.27 | 10.21 |
| Calculated Heads, Example III | 100 | 16.71 | 100 |

Summary Metallurgical Balance, Beneficiation of Surface Calcined Nahcolite by Sizing and Electrostatic Separation of Example III, Insoluble

| Fraction or Product | Assay* (%) | % Recovery |
|---|---|---|
| Conc. from ES Sepn** of +0.15 mm fractions | 42.10 | 7.07 |
| −0.15 mm fractions | 54.60 | 4.78 |
| Total Concentrate | 46.38 | 11.38 |
| Total Middlings | 85.80 | 27.31 |
| Total Tailings | 97.06 | 60.86 |

TABLE VI-continued

| | | |
|---|---|---|
| Calculated Heads, Example III | 83.29 | 100 |

*Calculated assays
**Electrostatic Separation

EXAMPLE V

Uncalcined Trona Ore

Electrostatic Separation

A grab sample of trona ore which had been crushed to −8.26 mm was taken from material "in process" at a monohydrate-process plant, ahead of the calciner. A kilogram of the sample was split out for a size analysis which yielded the following data.

Size Analysis of Uncalcined Trona Sample (Calciner Feed)

| Fraction | Particles Range - mm | Percent by Weight |
|---|---|---|
| 1 | +9.5 | 0 |
| 2 | 9.5 × 6.7 | 0.32 |
| 3 | 6.7 × 4.75 | 5.75 |
| 4 | 4.75 × 3.35 | 12.80 |
| 5 | 3.35 × 1.70 | 20.50 |
| 6 | 1.70 × 0.85 | 12.52 |
| 7 | 0.85 × 0.425 | 10.20 |
| 8 | 0.425 × 0.212 | 7.42 |
| 9 | −0.212 | 30.47 |

Fifty and one hundred gram portions of sized fractions 3, 4, 5, 6, 7 and 8 were processed with a Bullock-Simpson Electrostatic Separator. Operating parameters of the machine were varied over a wide range, as indicated in Table VII, with no effective separation occurring in any test on uncalcined trona ore.

TABLE VII

Operating Conditions for Bullock-Simpson Electrostatic Separator; Uncalcined Trona Feed

| | |
|---|---|
| Feed size range (mm): | 6.7 × 4.75, 4.75 × 3.35, 3.35 × 1.7, 1.7 × 0.85, 0.85 × 0.425, 0.425 × 0.212 |
| Feed temperature: | 20° C. |
| Feed depth, feed roll: | one particle deep |
| Feed roll type and diameter: | Micarta, 76.2 mm dia.; Brass, 76.2 mm dia. |
| Feed roll to charged roll gap: | 6.35 to 12.7 mm |
| Feed roll surface speed and direction: | 127 cm/min to 635 cm/min clockwise |
| Charged roll type and diameter: | Rubber, 50.8 mm dia. |
| Charged roll surface speed and direction: | 127 cm/min to 635 cm/min counterclockwise and clockwise |
| Position: Charged roll to feed roll: | −60° to −20° horiz. angle |
| Potential: Charged roll to ground: | 0 to 20,000 volts |
| Splitter positions: | Set for "barely pass" free-fall mat'l. |

EXAMPLE VI

Calcined Trona Ore

Electrostatic Separation

A grab sample of trona ore which had been crushed to −8.26 mm and calcined at 125° C.–250° C. in a rotary calciner for one-half hour was taken as "calciner spill" material at a monohydrate process soda ash plant. A kilogram of the sample was split out for size analysis which yielded the following data:

Size Analysis, Grab Sample of Calciner Spill

| Fraction | Particle Size Range - mm | Percent by Weight |
|---|---|---|
| 1 | +9.5 | 0.22 |
| 2 | 9.5 × 6.7 | 0.11 |
| 3 | 6.7 × 4.75 | 6.98 |
| 4 | 4.75 × 3.35 | 14.19 |
| 5 | 3.35 × 1.7 | 20.84 |
| 6 | 1.7 × 0.85 | 9.76 |
| 7 | 0.85 × 0.425 | 7.43 |
| 8 | 0.425 × 0.212 | 5.32 |
| 9 | −0.212 | 35.14 |

Fifty and one hundred gram portions of sized fractions split from the calciner spill sample were processed with a Bullock-Simpson Electrostatic Separator. Operating parameters were varied over a wide range (see Table VIII below), with good apparent separation of the calcined trona from gangue (shale/insoluble) particles. Selected test results are shown in Table IX.

TABLE VIII

Operating Conditions for Bullock-Simpson Electrostatic Separator; Calcined Trona Feed of Example VI

| | |
|---|---|
| Feed size range mm: | 1.7 × 0.425 (fract. #6 + #7); 0.425 × 0.212 (fract. #8) |
| Feed temperature: | 20° C. |
| Feed depth, feed roll: | one particle deep |
| Feed roll type and diameter: | Brass - 76.2 mm dia. |
| Feed roll to charged roll gap: | 6.35 mm |
| Feed roll surface speed and direction: | 254 cm/min, counterclockwise |
| Charged roll type and diameter: | Rubber, 50.8 mm dia. |
| Charged roll surface speed and direction: | 280 cm/min counterclockwise |
| Position: Charged roll to feed roll: | −60° horiz. angle |
| Potential: Charged roll to ground: | 14 KV (fract. #6 + #7); 10 KV (fract. #8) |
| Splitter positions: | Set to "barely pass" free-fall mat'l. |

From the test results indicated in Table IX, it may be seen that insolubles are concentrated in the tailing product and the concentrate "total alkali" assays are significantly upgraded (see calculated head assay). It is also apparent that the smaller-particle fraction (No. 8) contains less insoluble material and is not beneficiated as efficiently as are fractions 6 and 7.

TABLE IX

Test Results: Electrostatic Separation of Sized Fractions, Calcined Trona of Example VI

| | Weight Recov. | % TA* Assay | % TA* Recov. | % Insoluble Assay | % Insoluble Recov. |
|---|---|---|---|---|---|
| Combined Fraction No.'s, 6&7 | | | | | |
| Concentrate (pulled/thrown) | 40.41 | 97.39 | 46.90 | 3.21 | 8.26 |
| Middling (free-fall) | 39.31 | 92.59 | 43.37 | 6.77 | 16.90 |
| Tails (pinned) | 20.28 | 40.26 | 9.72 | 58.07 | 74.84 |
| Calculated Heads | 100 | 83.92 | 100 | 15.74 | 100 |
| Fraction No. 8 | | | | | |
| Concentrate (pulled/thrown) | 33.97 | 93.89 | 35.21 | 5.40 | 21.33 |
| Middling (free-fall) | 42.99 | 91.60 | 43.48 | 7.47 | 37.41 |
| Tails (pinned) | 23.05 | 83.73 | 21.31 | 15.35 | 41.26 |
| Calculated Heads | 100 | 90.57 | 100 | 8.58 | 100 |

*TA = Total alkali

EXAMPLE VII

Calcined Trona Ore, Beneficiation by Sizing and High Tension Separation

Two calciner products were sampled at a monohydrate process soda ash plant to obtain calcined (150° C.-250° C.) feed for testing on a CARPCO Laboratory Model High Tension Separator manufactured by the National Engineering Company of Chicago, Illinois. One calciner product was calciner spill and its size analysis is reported in Table X below, and includes distribution of values by sized fraction. The other calciner product was calciner fines (cyclone discharge) and its size analysis is reported in Table XI.

TABLE X

Size Analysis and Distribution of Values by Sized Fraction, Calciner Spill-Trona, Total Alkali (TA)

| Fraction No. | Sized Fraction (mm) | % Weight | Assay % TA | % Recovery |
|---|---|---|---|---|
| 1 | 9.5 × 6.7 | 3.04 | 73.5 | 2.75 |
| 2 | 6.7 × 4.75 | 11.12 | 79.7 | 10.94 |
| 3 | 4.75 × 3.35 | 16.38 | 81.4 | 16.45 |
| 4 | 3.35 × 1.7 | 19.67 | 80.8 | 19.61 |
| 5 | 1.7 × 1.18 | 5.76 | 79.8 | 5.68 |
| 6 | 1.18 × 0.85 | 7.05 | 77.1 | 6.71 |
| 7 | 0.85 × 0.425 | 8.90 | 75.9 | 8.34 |
| 8 | 0.425 × 0.212 | 9.14 | 78.6 | 8.86 |
| 9 | 0.212 × 0.15 | 3.59 | 87.5 | 3.88 |
| 10 | 0.15 × 0.106 | 3.75 | 88.2 | 4.09 |
| 11 | 0.106 × 0.075 | 2.91 | 91.2 | 3.27 |
| 12 | −0.075 | 8.69 | 87.8 | 9.42 |
| Calculated Heads | | 100 | 81.02 | 100 |

TABLE X-continued

Size Analysis and Distribution of Values by Sized Fraction, Calciner Spill-Trona, Insolubles

| Fraction No. | Assay % Insol. | % Recovery |
|---|---|---|
| 1 | 24.2 | 4.24 |
| 2 | 19.1 | 12.23 |
| 3 | 16.2 | 15.28 |
| 4 | 18.3 | 20.76 |
| 5 | 17.4 | 5.77 |
| 6 | 20.4 | 8.30 |
| 7 | 24.8 | 12.75 |
| 8 | 17.4 | 9.17 |
| 9 | 14.0 | 2.88 |
| 10 | 11.5 | 2.48 |
| 11 | 10.5 | 1.79 |
| 12 | 8.6 | 4.33 |
| Calculated Heads | 17.34 | 100 |

TABLE XI

Size Analysis and Distribution of Values by Sized Fraction, Calciner Fines-Trona (Cyclone Discharge)

| Fraction No.* | Sized Fraction (mm) | % Weight | Total Alkali (TA) Assay % TA | % Recovery |
|---|---|---|---|---|
| 7 | 0.85 × 0.425 | 0.09 | — | — |
| 8 | 0.425 × 0.212 | 3.19 | 88.4 | 3.2 |
| 9 | 0.212 × 0.15 | 11.37 | 91.6 | 11.4 |
| 10 | 0.15 × 0.106 | 19.59 | 91.5 | 19.6 |
| 11 | 0.106 × 0.075 | 12.52 | 92.1 | 12.6 |
| 12 | −0.075 | 53.24 | 91.3 | 53.2 |
| Calculated Heads | | 100 | 91.37 | 100 |

| Fraction No.* | Assay % Insol. | % Recovery |
|---|---|---|
| 7 | — | — |
| 8 | 11.0 | 4.4 |
| 9 | 9.2 | 3.7 |
| 10 | 8.7 | 20.7 |
| 11 | 8.8 | 13.4 |
| 12 | 8.9 | 57.8 |
| Calculated Heads | 8.20 | 100 |

*Fraction No's are assigned to same sized fractions as in Table X for consistency.

Combined fractions and products, prepared by sizing, for beneficiation tests are represented in Table XII below.

It can be seen from Table XII that segregation by sizing has effected a very significant beneficiation, the −0.212 mm calciner spill assays over 88% TA and the calciner fines (nominally −0.212 mm) assay over 91% TA. This is an important advantage as these fines are more difficult to economically process with high tension separation than are the particles larger than 0.212 mm (up to a maximum of about 6.7 mm or 9.5 mm).

TABLE XII

Distribution of Values by Sized Fraction, Total Calciner Product (Spill and Fines)

| Fraction No. | Sized Fraction (mm) | % Weight | Total Alkali (TA) Assay % TA | % Recovery |
|---|---|---|---|---|
| 1,2,3 | 9.5 × 3.35 | 25.95 | 79.96 | 25.13 |
| 4 | 3.35 × 1.7 | 16.72 | 80.8 | 16.36 |
| 5 | 1.7 × 1.18 | 4.90 | 79.8 | 4.74 |
| 6 | 1.18 × 0.85 | 5.99 | 77.1 | 5.59 |
| 7 | 0.85 × 0.425 | 7.57 | 75.9 | 6.96 |
| 8 | 0.425 × 0.212 | 7.77 | 78.6 | 7.40 |
| 9,10,11,12 (Calciner Fines) | −0.212 | 16.10 | 88.3 | 17.22 |
| 7,8,9,10,11,12 | −0.212 equiv. | 15.0 | 91.37 | 16.60 |
| Calculated Heads | | 100 | 82.57 | 100 |

| Fraction No. | Insolubles (Insol.) Assay % Insol. | % Recovery |
|---|---|---|
| 1,2,3 | 18.05 | 29.32 |
| 4 | 18.3 | 19.16 |
| 5 | 17.4 | 5.34 |
| 6 | 20.4 | 7.65 |
| 7 | 24.8 | 11.76 |
| 8 | 17.4 | 8.47 |
| 9,10,11,12 (Calciner Fines) | 10.5 | 10.60 |
| 7,8,9,10,11,12 | 8.20 | 7.70 |
| Calculated Heads | 15.97 | 100 |

Figure 3:
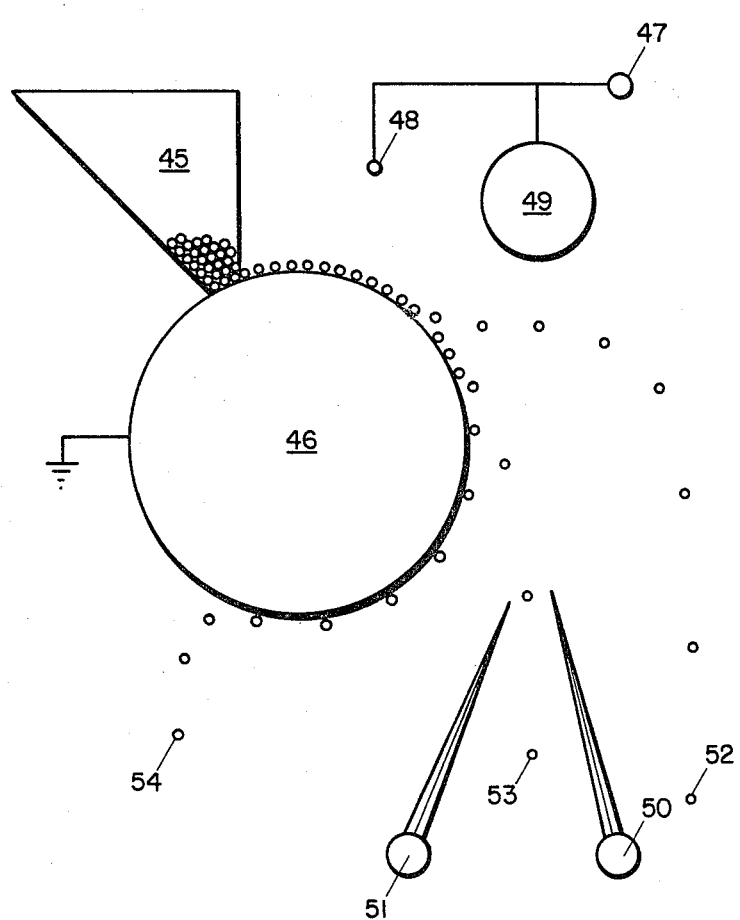
FIG. 3 illustrates a CARPCO Laboratory model high tension separator and shows the material flow.

Portions of the sized and combined fractions (listed in Table XII) larger than fraction 9 (0.208 mm) were processed in a CARPCO Laboratory High Tension Separator (see FIG. 3). As shown in FIG. 3, the CARPCO Laboratory Model High Tension Separator is provided with a feed hopper 45, a clockwise rotating grounded feed roll 46, a high voltage supply 47, a wire electrode 48 and a cylindrical electrode 49, and splitters 50 and 51 which may separate the feed into a pulled or thrown product (concentrate fraction 52), a middling fraction 53, and a pinned or non-conductor product (tailings fraction 54). Operating parameters for selected tests are tabulated in Table XIII.

TABLE XIII

Operating Conditions for CARPCO High Tension Separator; Selected Tests, Calcined Trona Feed at 20° C. From High Tension Electrodes to Feed Roll

| Sized Fraction mm | Surface Vel. Feed Roll cm/min | Spacing Wire to Feed Roll | Spacing Cylinder to Feed Roll |
|---|---|---|---|
| +3.35* | 2476 | 25.4 mm | 26.9 mm |
| 3.35 × 1.7 | 3988 | 25.4 mm | 26.9 mm |
| 1.7 × 1.18 | 3124 | 25.4 mm | 26.9 mm |

TABLE XIII-continued

Operating Conditions for CARPCO High Tension Separator;
Selected Tests, Calcined Trona Feed at 20° C.
From High Tension Electrodes to Feed Roll

| | | | |
|---|---|---|---|
| 1.18 × 0.85 | 2756 | 25.4 mm | 26.9 mm |
| 0.85 × 0.425 | 3429 | 25.4 mm | 26.9 mm |
| 0.425 × 0.212 | 3912 | 25.4 mm | 26.9 mm |

| Sized Fraction mm | Potential To Feed Roll (KV) | No. of Passes, Free-fall Material |
|---|---|---|
| +3.35 | 20 | 1 |
| 3.35 × 1.7 | 21 | 10 |
| 1.7 × 1.18 | 20 | 10 |
| 1.18 × 0.85 | 16 | 5 |
| 0.85 × 0.425 | 20 | 10 |
| 0.425 × 0.212 | 11 | 10 |

*No tests were completed with fractions containing particles larger than 4.75 mm. The particular CARPCO High Tension Separator utilized a feed hopper-feed roll configuration that did not allow the larger particles to feed. However, the larger trona and gangue particles (to 9.5 mm) were readily separated to produce "clean" concentrate and tailing products.

The results of these tests are shown in the metallurgical balance of Table XIV.

A summary of this data with appropriate inclusion of the calciner fines and other −0.212 mm material, to simulate beneficiation of the total material stream, is shown in Table XV.

TABLE XIV

Metallurgical Balance, High Tension Separation Products, Calciner Spill, Trona, Weight Recovery

| Fraction or Product mm | % of Fraction | % of Product |
|---|---|---|
| +3.35 | 100 | 30.54 |
| Concentrate I | 0.20 | 0.01 |
| Concentrate II | 95.39 | 29.13 |
| Tailing | 4.40 | 1.34 |
| 3.35 × 1.7 | 100 | 19.67 |
| Concentrate | 68.17 | 13.36 |
| Middling | 19.38 | 3.80 |
| Tailing | 12.45 | 2.44 |
| 1.7 × 1.18 | 100 | 5.76 |
| Concentrate | 79.66 | 4.59 |
| Middling | 3.31 | 0.19 |
| Tailing | 17.03 | 0.98 |
| 1.18 × 0.85 | 100 | 7.05 |
| Concentrate | 66.57 | 4.99 |
| Middling | 27.06 | 2.03 |
| Tailing | 6.37 | 0.48 |
| 0.85 × 0.425 | 100 | 8.90 |
| Concentrate | 71.41 | 6.36 |
| Middling | 22.02 | 1.96 |
| Tailing | 6.57 | 0.58 |
| 0.425 × 0.212 | 100 | 9.14 |
| Concentrate | 60.67 | 5.55 |
| Middling I | 31.05 | 2.84 |
| Middling II | 8.27 | 0.76 |

TABLE XIV-continued

| | | |
|---|---|---|
| −0.212 | 100 | 18.94 |
| Calculated Heads (Calciner Spill) | 100 | 100 |

Metallurgical Balance, High Tension Separation Products, Calciner Spill, Trona, Total Alkali Recovery

| Fraction or Product mm | Assay (%) | % of Fraction | % of Total |
|---|---|---|---|
| +3.35 | 83.52 | 100 | 30.9 |
| Concentrate I | — | — | — |
| Concentrate II | 87.10 | 99.5 | 30.8 |
| Tailing | 9.97 | 0.5 | 0.1 |
| 3.35 × 1.7 | 81.25 | 100 | 19.4 |
| Concentrate | 95.20 | 79.9 | 15.5 |
| Middling | 72.51 | 17.3 | 3.4 |
| Tailing | 18.44 | 2.8 | 0.5 |
| 1.7 × 1.18 | 78.93 | 100 | 5.5 |
| Concentrate | 95.32 | 96.2 | 5.3 |
| Middling | 16.61 | 0.7 | 0.1 |
| Tailing | 14.37 | 3.1 | 1.1 |
| 1.18 × 0.85 | 73.75 | 100 | 6.3 |
| Concentrate | 90.25 | 81.5 | 5.1 |
| Middling | 38.58 | 14.2 | 0.9 |
| Tailing | 50.71 | 4.4 | 0.3 |
| 0.85 × 0.425 | 80.90 | 100 | 8.7 |
| Middling | 56.36 | 15.3 | 1.3 |
| Tailing | 6.53 | 0.5 | 0.1 |
| 0.425 × 0.212 | 81.80 | 100 | 9.1 |
| Concentrate | 91.17 | 67.6 | 6.2 |
| Middling I | 64.17 | 24.4 | 2.2 |
| Middling II | 79.43 | 8.0 | 0.7 |
| −0.212 | 88.01 | 100 | 20.1 |
| Calculated Heads (Calciner Spill) | 82.58 | 100 | 100 |

Metallurgical Balance, High Tension Separation Products, Calciner Spill, Trona, Insolubles Recovery

| Fraction or Product (mm) | Assay (%) | % of Fraction | % of Total |
|---|---|---|---|
| +3.35 | 10.62 | 100 | 21.9 |
| Concentrate I | — | — | — |
| Concentrate II | 6.90 | 62.0 | 13.6 |
| Tailing | 91.76 | 38.0 | 8.3 |
| 3.35 × 1.7 | 17.18 | 100 | 22.9 |
| Concentrate | 2.88 | 11.4 | 2.6 |
| Middling | 27.31 | 30.8 | 7.0 |
| Tailing | 79.77 | 57.8 | 13.2 |
| 1.7 × 1.18 | 19.82 | 100 | 7.7 |
| Concentrate | 3.92 | 15.7 | 1.2 |
| Middling | 81.13 | 13.6 | 1.0 |
| Tailing | 82.27 | 70.7 | 5.4 |
| 1.18 × 0.85 | 25.46 | 100 | 12.1 |
| Concentrate | 9.72 | 25.4 | 3.1 |
| Middling | 61.12 | 65.0 | 7.9 |
| Tailing | 38.46 | 9.6 | 1.2 |
| 0.85 × 0.425 | 18.36 | 100 | 11.0 |
| Concentrate | 4.40 | 17.1 | 1.9 |
| Middling | 41.22 | 49.5 | 5.4 |
| Tailing | 93.51 | 33.4 | 3.7 |
| 0.425 × 0.212 | 17.68 | 100 | 10.9 |
| Concentrate | 8.72 | 29.9 | 3.3 |
| Middling I | 34.45 | 60.5 | 6.6 |
| Middling II | 20.44 | 9.6 | 1.0 |
| −0.212 | 10.51 | 100 | 13.5 |
| Calculated Heads (Calciner Spill) | 14.78 | 100 | 100 |

NOTE:
Due to inherent analytical inaccuracies, total alkali and insolubles assays may not total 100%.

TABLE XV

Summary: Metallurgical Balance, Beneficiation of Calcined Trona by Sizing and High Tension Separation

| Fraction or Product | % Weight Recovery | Total Alkali Assay (%) | Total Alkali % Recovery |
|---|---|---|---|
| H.T.S.* Conc. from −0.212 mm Calciner Spill | 54.4 | 89.4 | 58.4 |
| −0.212 mm of Calciner Spill | 16.1 | 88.3 | 17.1 |
| Calciner Fines (normal −0.212 mm) | 15.0 | 91.4 | 16.5 |
| Total Concentrate | 85.5 | 89.5 | 92.0 |
| Total Middlings** | 10.2 | 59.0 | 7.2 |
| Total Tailings | 4.5 | 14.2 | 0.8 |
| Calculated Heads | 100 | 83.2 | 100 |

| Fraction or Product | Insolubles Assay (%) | Insolubles % Recovery |
|---|---|---|
| H.T.S.* Conc. from −0.212 mm Calciner Spill | 6.0 | 21.1 |
| −0.212 mm of Calciner Spill | 10.5 | 10.9 |
| Calciner Fines (normal −0.212 mm) | 8.2 | 8.0 |
| Total Concentrate | 7.2 | 40.0 |
| Total Middlings** | 50.3 | 33.2 |
| Total Tailings | 92.0 | 26.8 |
| Calculated Heads | 15.5 | 100 |

*High Tension Separator
**This product would be recycled

As can be seen, the total alkali assay of the concentrate is increased to about 90% while the insolubles decrease to 7.2%, less than half that in the unbeneficiated feed stream.

The total concentrate may be used as a high grade feed to a monohydrate refining process.

We claim:

1. A process for beneficiating an ore containing sodium carbonate values in combination with insoluble impurities said ore being selected from the group consisting of trona bearing ore and nahcolite bearing ore, to give a product containing a greater percentage of sodium carbonate and a lesser percentage of insoluble impurities than were present in said ore which comprises: crushing said ore to a particle size smaller than about 6.7 mm, returning ore particles larger than about 6.7 mm to the crusher, calcining the crushed ore particles to provide at least a surface coating of sodium carbonate, separating fines from the calciner off-gases and collecting said fines in a container; separating the calcined ore particles into a plurality of fractions containing particles of relatively uniform particle size, collecting that sized fraction having a particle size less than about 0.212 mm in a container, passing the other sized fractions through a high voltage gradient thereby effecting a separation of said other sized fractions into an ore concentrate containing a greater percentage of sodium carbonate and a lesser percentage of insoluble impurities than were present in said other sized fractions and ore tailings containing a lesser percentage of sodium carbonate and a greater percentage of insoluble impurities than were present in said other sized fractions, collecting said ore concentrate from each of said other sized fractions in a container, and combining said fines with that sized fraction having a particle size less than about 0.212 mm and said ore concentrate from each of said other sized fractions to produce a technical grade of soda ash.

2. The process of claim 1 wherein said ore is a trona bearing ore.

3. The process of claim 2 wherein said ore is a nahcolite bearing ore.

4. The process of claim 1 wherein all of said ore particles in said plurality of fractions are less than about 6.7 mm in size.

5. The process of claim 1 wherein there is obtained by passing a sized fraction through a high voltage gradient an ore concentrate containing a greater percentage of sodium carbonate and a lesser percentage of insoluble impurities, a middling fraction and an ore tailing fraction that contains a lesser percentage of sodium carbonate and a greater percentage of insoluble impurities than said ore concentrate.

6. The process of claim 5 wherein said middling fraction is recycled through the high voltage gradient.

7. The process of claim 1 wherein the largest of said plurality of fractions contains particles from about 1.7 mm to about 6.7 mm and the smallest of said plurality of fractions contains particles from about 0.212 mm to about 0.5 mm in size.

8. A process for beneficiating an ore containing sodium carbonate values in combination with insoluble impurities said ore being selected from the group consisting of trona bearing ore and nahcolite bearing ore to give a product containing a greater percentage of sodium carbonate and a lesser percentage of insoluble impurities than were present in said ore which comprises: calcining the ore to provide at least a surface coating of sodium carbonate, separating fines from the calciner off-gases and collecting said fines in a container; crushing said calcined ore to a particle size smaller than about 6.7 mm, returning ore particles larger than about 6.7 mm to the crusher, separating the calcined ore particles smaller than about 6.7 mm into a plurality of fractions containing particles of relatively uniform particle size, collecting that sized fraction having a particle size less than about 0.212 mm in a container, passing the other sized fractions through a high voltage gradient thereby effecting a separation of said other sized fractions into an ore concentrate containing a greater percentage of sodium carbonate and a lesser percentage of insoluble impurities than were present in said other sized fractions, and ore tailings containing a lesser percentage of sodium carbonate and a greater percentage of insoluble impurities than were present in said other sized fractions, collecting said ore fraction from each of said other sized fractions in a container, and combining said fines with that sized fraction having a particle size less than about 0.212 mm and said ore concentrate from each of said other sized fractions to produce technical grade of soda ash.

9. The process of claim 8 wherein said ore is a trona bearing ore.

10. The process of claim 8 wherein said ore is a nahcolite bearing ore.

* * * * *

UNITED STATES PATENT AND TRADEMARK OFFICE
CERTIFICATE OF CORRECTION

PATENT NO. : 4,375,454
DATED : March 1, 1983
INVENTOR(S) : Eugene G. Imperato and Orval H. Hilliard It is certified that error appears in the above—identified patent and that said Letters Patent is hereby corrected as shown below:

Cover page in the Abstract, first paragraph, line 15, "marked" should read --marketed--; column 16, table XIV, line 26, insert, "concentrate 95.31 84.1 7.3" directly under "0.85 x 0.425 80.90 100 8.7"; in the claims, claim 3, "The process of claim 2 wherein said ore is a nahcolite bearing ore" should read --The process of claim 1 wherein said ore is a nahcolite bearing ore--.

Signed and Sealed this

Thirty-first Day of May 1983

[SEAL]

Attest:

DONALD J. QUIGG

Attesting Officer

Acting Commissioner of Patents and Trademarks